United States Patent [19]

Kosaka et al.

[11] Patent Number: 5,006,700
[45] Date of Patent: Apr. 9, 1991

[54] DISTANCE-MEASURING APPARATUS FOR CAMERA

[75] Inventors: Toru Kosaka, Zama; Yoshiaki Ohtsubo, Yokohama; Hiroshi Meguro, Kawasaki, all of Japan

[73] Assignee: Nikon Corporation, Tokyo, Japan

[21] Appl. No.: 569,537

[22] Filed: Aug. 20, 1990

Related U.S. Application Data

[63] Continuation of Ser. No. 328,435, Mar. 24, 1989, abandoned.

[30] Foreign Application Priority Data

Apr. 11, 1988 [JP] Japan .................................. 63-88452

[51] Int. Cl.$^5$ ............................................. G01J 1/20
[52] U.S. Cl. ................... 250/201.4; 354/403
[58] Field of Search ............ 250/201 AF, 204, 201.4; 356/1, 4; 354/403

[56] References Cited

U.S. PATENT DOCUMENTS 4,606,629 8/1986 Hines ........................................ 356/1
4,764,786 8/1988 Tamura ................................ 354/403

FOREIGN PATENT DOCUMENTS 56-101128 8/1981 Japan .
59-143914 8/1984 Japan .
62-14015 1/1987 Japan .

Primary Examiner—David C. Nelms
Attorney, Agent, or Firm—Shapiro and Shapiro

[57] ABSTRACT

A distance-measuring apparatus comprises a first detecting device for detecting a distance to a central portion of an object field corresponding to a photographing frame and generating data corresponding to a detected distance, a second detecting device for detecting distances to a plurality of peripheral portions of the object field except for the central portion and generating data corresponding to detected distances, and an operating device for operating the first and second detecting devices. The oeprating device has a first operation step of operating the first detecting device and a second operation step of operating the second detecting device. The first step is executed to determine the detected distance to the central portion. The execution of the second step depends on the determination result and may produce an average peripheral distance output or a shortest peripheral distance output for driving a phototaking lens. Depending upon the determination result, a central distance output may instead by produced.

8 Claims, 5 Drawing Sheets

DISTANCE-MEASURING APPARATUS FOR CAMERA

This is a continuation of application Ser. No. 328,435 filed Mar. 24, 1989, now abandoned.

BACKGROUND OF THE INVENTION

1. Field of the Invention

The present invention relates to a multi-point distance-measuring apparatus capable of performing distance measurements in a plurality of directions within a field in a viewfinder and, more particularly, to a multi-point distance-measuring apparatus capable of performing distance measurements at a central portion of a field in a viewfinder with priority.

2. Related Background Art

Many conventional "center distance measurement" type distance-measuring apparatuses wherein a distance between the camera and an object observed within a narrow distance-measuring zone defined at a central portion of a field in a viewfinder have been used in conventional auto focus (AF) cameras. In the "center distance measurement" type apparatus, the distance-measuring zone is limited to only the central portion of the field. Therefore, a principal object falling outside the central portion of the field often tends to be out of focus. In order to eliminate the drawback of this conventional apparatus, the following conventional distance-measuring apparatuses are available:

(1) a multi-point distance-measuring apparatus in which a plurality of positions within a field of view are sequentially set at the center of the field, and an intermediate distance between the longest distance and the shortest distance is calculated to set a lens position (Japanese Patent Laid-Open (Kokai) No. 56-101128);

(2) a multi-point distance-measuring apparatus in which object positions corresponding to a plurality of points set in the field of view are sequentially scanned with a light spot to time-serially detect distances to these points, thereby setting a lens position on the basis of the detected shortest distance (Japanese Patent Laid-Open (Kokai) No. 59-143914); and (3) a multi-point distance-measuring apparatus in which narrow-field distance measurement for measuring a narrow area within the field and wide-field distance measurement for performing average distance measurement of a wide field are arbitrarily switched upon operation of a selection button in accordance with an object position within the field (Japanese Patent Laid-Open (Kokai) No. 62-14015).

However, the above known conventional apparatuses are arranged such that distance measurements are performed by always projecting light in a plurality of directions even if a principal object is located at the center of the field of view of the viewfinder. It therefore takes a long period of time to measure a distance to an object as compared with a conventional distance-measuring system which has been most popular. In addition, power consumption of a battery is undesirably increased.

More specifically, in each apparatus disclosed in Japanese Patent Laid-Open (Kokai) Nos. 56-101128 and 59-143914, even if a principal object is located at the center of the field of view in the viewfinder, light is always projected in a plurality of directions to measure a distance to the object. Therefore, the power consumption of the battery is increased, and distance-measuring time is also prolonged. In the conventional apparatus disclosed in Japanese Patent Laid-Open No. 62-14015, operations are complicated, and light is projected in a wide range even if an object requires only a narrow-view distance measurement. As a result, the power consumption of the battery is undesirably increased.

SUMMARY OF THE INVENTION

It is, therefore, an object of the present invention to solve the conventional problems described above and to provide a distance-measuring apparatus for a camera which has low power consumption, requires simple operations, and can assure high precision for distance measurement.

In order to achieve the above object of the present invention, there is provided a distance-measuring apparatus comprising: first detecting means for detecting a distance to a central portion of an object field corresponding to a photographing frame and generating data corresponding to a detected distance; second detecting means for detecting distances to a plurality of peripheral portions of the object field except for the central portion and generating data corresponding to detected distances; and means for operating the first and second detecting means. The operating means has a first operation step of operating the first detecting means and a second operation step of operating the second detecting means. The first step is executed to determine the detected distance to the central portion. The second step is executed on the basis of a determination result.

When the present invention is applied to an active type distance-measuring apparatus, the first detecting means comprises a light-emitting element for emitting a radiation beam toward the central portion of the object field and a light-receiving element for receiving a reflected beam. The second detecting means comprises a plurality of light-emitting elements for emitting radiation beams toward the plurality of predetermined peripheral portions and light-receiving elements for receiving reflected beams.

The present invention is also applicable to a passive type distance-measuring apparatus such as a TTL distance-measuring apparatus for a single-lens reflex camera.

According to the present invention, the distance to the central portion is measured before the distances to the peripheral portions are measured. If the detected distance falls within a predetermined distance range, the distance measurement is ended without detecting the distances to the peripheral portions. When the principal object is located at the central portion of the field in the viewfinder, a total sequence time from the start of distance measurement to the end of focus control can be shortened as compared with the conventional arrangements wherein the plurality of light-emitting elements are always operated, or the camera is moved to measure distances to individual objects, i.e., the central object and the peripheral objects. Therefore, according to the present invention, a user does not miss a photographing opportunity, and wasteful power consumption of the battery can be prevented.

The above and other objects, features, and advantages of the present invention will be apparent from the detailed description in conjunction with the accompanying drawings.

DESCRIPTION OF THE PREFERRED EMBODIMENTS

Preferred embodiments of the present invention will be described in detail with reference to the accompanying drawings.

Figure 1:
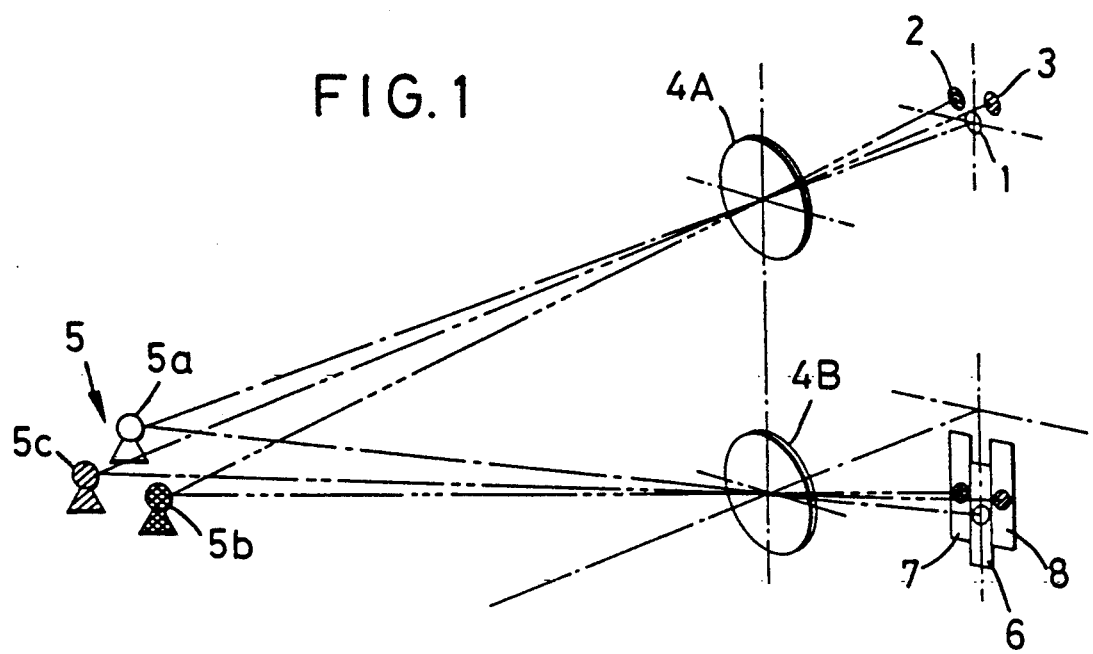
FIG. 1 is a view for explaining the principle of distance measurement according to the present invention.
Figure 2:
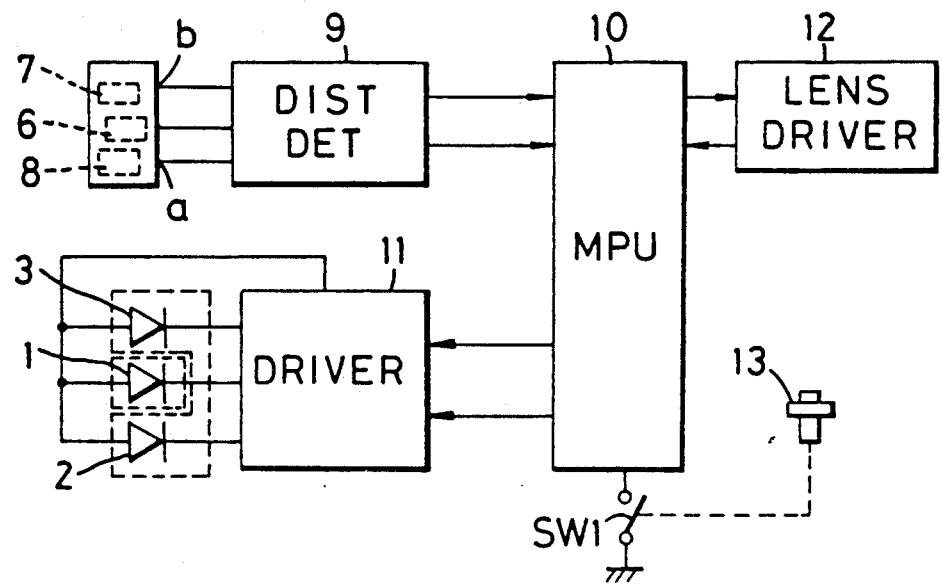
FIG. 2 is a block diagram showing an electrical system according to the present invention.

FIG. 1 is a view showing the principle of distance measurement according to the present invention, and FIG. 2 is a block diagram showing an electrical circuit of the present invention.

Figure 3:
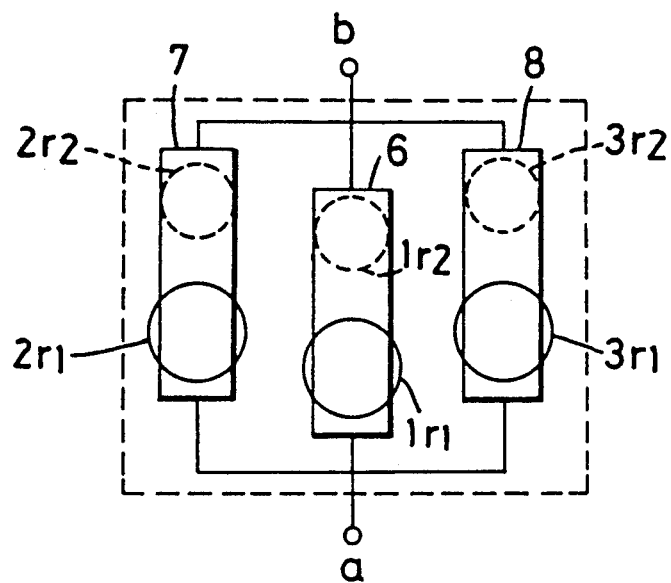
FIG. 3 is a plan view showing layout of three position sensors in FIG. 1.

Referring to FIGS. 1 and 2, infrared rays emitted from a first light-emitting element 1 of an infrared source and two second light-emitting elements 2 and 3 located to interpose the first light-emitting element 1 therebetween are projected as light spots onto an object 5 through a projection lens 4A and received by a semiconductor position detecting element (to be referred to as a position sensor hereinafter) providing a first position sensor 6 corresponding to the first light-emitting element 1 and second position sensors 7 and 8 respectively corresponding to the second light-emitting elements 2 and 3 through a light-receiving lens 4B located below the projection lens 4A. The three position sensors 6, 7, and 8 are arranged parallel to each other, as shown in FIG. 3. Analog output signals output from end output lines a and b connected to the end position sensors 7 and 8 are converted into digital distance signals by a distance detector 9 shown in FIG. 2. These digital distance signals are supplied to a microcomputer (to be referred to as an MPU hereinafter) 10. The cathodes of the three light-emitting elements 1, 2, and 3 are connected to a driver 11 controlled by a signal from the MPU 10. The anodes of the light-emitting elements 1, 2, and 3 are commonly connected to the driver 11.

The MPU 10 has a function for determining distance provided by the distance signals output from the distance detector 9 and a function for comparing the detected distances with a predetermined distance prestored in a memory. The MPU 10 further has a function for supplying control signals to selectively drive the light-emitting elements 1, 2, and 3. The MPU 10 supplies a control signal to a lens driver 12 to move a photographing lens (not shown) on the basis of the detected distance.

Figure 4:
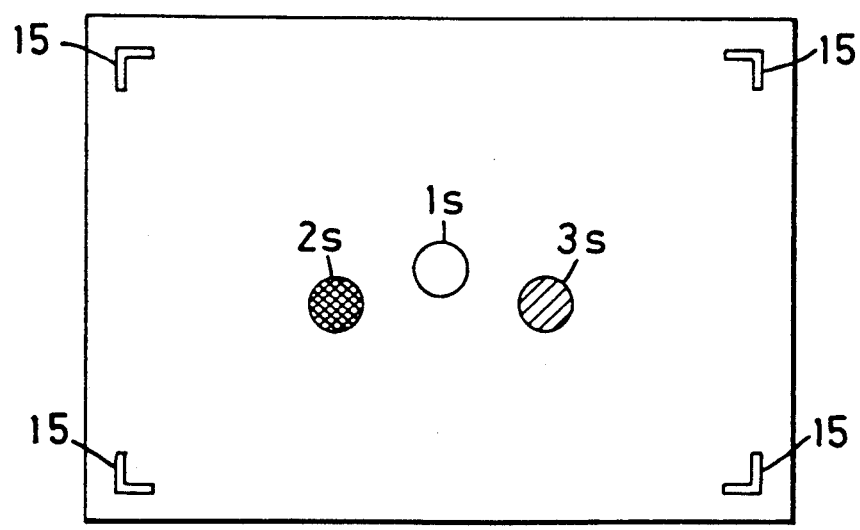
FIG. 4 is a plan view showing a distance-measuring area within a field of the camera viewfinder.

FIG. 4 is a plan view showing a field in a viewfinder. The light spot emitted from the first light-emitting element 1 is formed in a cental area 1s in a photographing frame 15. The light spots emitted from the second light-emitting elements 2 and 3 are located in left and right areas 2s and 3s slightly spaced apart from the central area 1s. Therefore, when the object 5 is located within the areas 1s, 2s, and 3s in the frame (corresponding to positions 5a, 5b, and 5c in FIG., reflected spot light beams from the object 5 irradiated with the spot light beams as shown in FIG. 1 are focused as light spots on the position sensors 6, 7, and 8, as shown in FIG. 3. In this case, when the object 5 is located at a position near the camera, the light spots are located at lower positions represented by reference symbols 1r1, 2r1, and 3r1 in FIG. 3. When the object 5 is located at a position farther from the camera, the light spots are located at upper positions represented by reference symbols 1r2, 2r2, and 3r2. When the object 5 is located at a position far away from the camera, the reflected beams do not reach the position sensors 6, 7, and 8 or cannot be detected because the intensities of reflected light beams are very low. In this case, the object 5 is determined to fall within the range of hyperfocal distance at which an object of infinity can fall within the depth of field. Therefore, the photographing lens (not shown) is moved to an infinity (∞) position.

Assume that a focal length of a photographing lens is given as f, that an f-number is given as F, and that an allowable image defocus amount (e.g., 0.05 mm) is given as d. Under these assumptions, a hyperfocal distance is defined as $HD = f^2/Fd$. When the photographing lens is moved to a position corresponding to the hyperfocal distance HD and focus control is performed, a clear image of objects falling within the range of a distance HD/2 to infinity can be obtained.

In the central portion priority distance-measuring apparatus according to the present invention, various embodiments can be obtained by different operations of the MPU 10 shown in FIG. 2. FIGS. 5 to 8 are flow charts showing different operations according to first to fourth embodiments of the present invention. These embodiments will be described in detail with reference to the accompanying drawings below.

Figure 5:
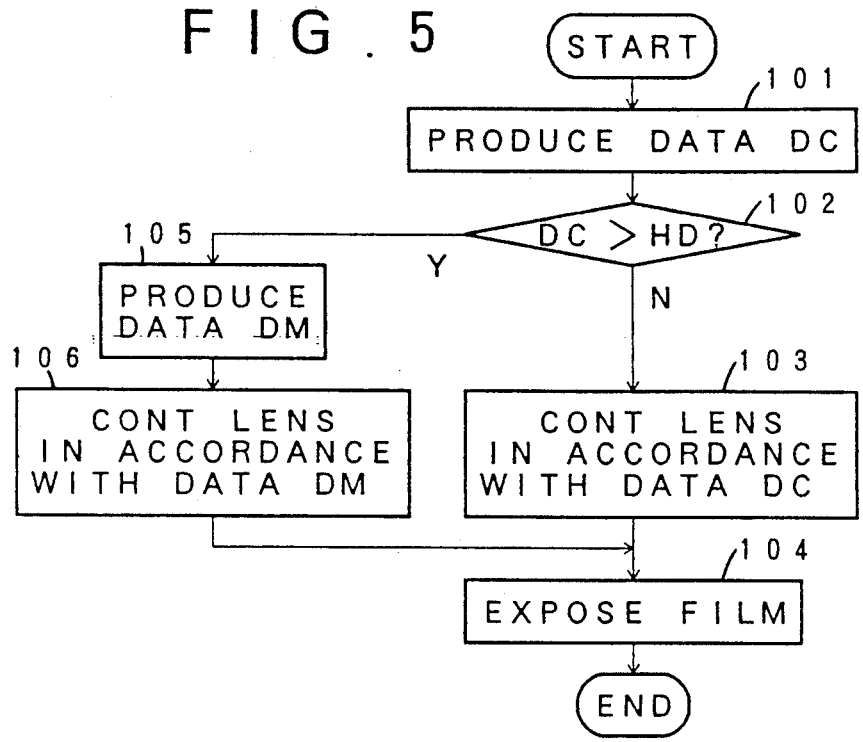
FIGS. 5, 6, 7 and 8 are flow charts for explaining operations of first to fourth embodiments of the present invention.

First Embodiment (FIG. 5)

When a release button 13 (FIG. 2) is depressed by a first stroke, the MPU 10 starts its operations in response to a signal from a switch SW1 interlocked with the release button 13. In step 101, the MPU 10 sends a control signal to the driver 11 to drive the first light-emitting element 1. Infrared rays from the first light-emitting element 1 are projected to an object 5a located within the central area 1s (FIG. 4) of the field of the viewfinder through the projection lens 4A (FIG. 1). A beam reflected by the object 5a is focused as a light spot on the first position sensor 6 through the light-receiving lens 4B, and a signal corresponding to a distance to the object 5a is output from the first position sensor 6. This output signal is converted by the distance detector 9 into a digital signal corresponding to the object distance. Data (data DC) representing a central portion distance DC is stored in a memory in the MPU 10, thereby completing a distance measurement of the central portion.

In step 102, the data DC stored in the MPU 10 is compared with the ∞ position, i.e., the prestored hyperfocal distance HD which allows an in-focus state up to infinity to determine whether the data DC represents a distance longer than the hyperfocal distance. If NO in step 102, i.e., the data DC does not represent a position corresponding to the ∞ position or does not represent a distance longer than the hyperfocal position, the MPU determines that a principal object is located at the central portion of the field of the viewfinder. The MPU supplies a control signal to the lens driver 12 to control movement of the photographing lens on the basis of the distance-measured data of the central portion. When this focal control is completed, film exposure is performed in step 104.

However, when the MPU determines in step 102 that the data DC represents a position corresponding to the ∞ position, a possibility of the principal object falling outside the central portion in the field of the viewfinder is high. In this case, in step 105, the two light-emitting elements 2 and 3 are simultaneously operated to obtain an average distance DM of distances measured by the right and left beams on the basis of position signals output from the position sensors 7 and 8, thereby producing corresponding data DM. The position of the photographing lens is controlled in accordance with the data DM, and the flow advances to step 104, thereby completing a series of operations.

According to the first embodiment described above, the MPU detects the object distance corresponding to the central portion of the frame. If the detected distance falls within the predetermined distance, the lens is moved to the position corresponding to the detected object distance, and focal control is performed. In this case, since the two light-emitting elements 2 and 3, and the two position sensors 7 and 8 are not driven at all, the power consumption of the battery is low. In addition, the distance measurement can be completed within a short period of time. In this case, the hyperfocal distance is defined as the predetermined distance. When the detected distance is longer than the predetermined distance, the MPU determines that the principal object is located in a peripheral portion of the field of the viewfinder. The two light-emitting elements 2 and 3 are simultaneously operated to determine an average distance of the distances to the plurality of peripheral portions. Focal control is then performed on the basis of the average distance. Therefore, the distance measurements of the peripheral portions can also be completed within a relatively short period of time.

Figure 6:
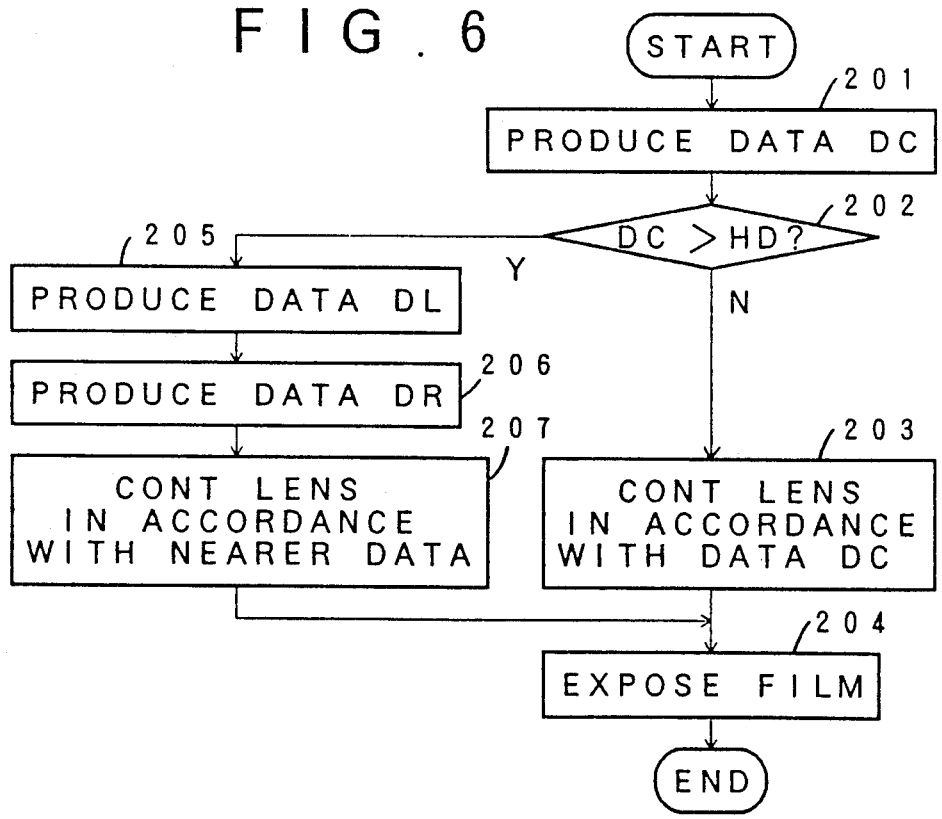

Second Embodiment (FIG. 6)

The MPU starts its operations in response to a signal from the switch SW1 interlocked with the release button 13. The operations from step 201 to step 204 in the second embodiment are the same as those from step 101 to step 104 in the first embodiment, and a detailed description thereof will be omitted.

In step 202, when the MPU determines that the central portion data DC represents a distance longer than the hyperfocal distance HD, the MPU drives one of the end light-emitting elements, e.g., the light-emitting element 2 to measure a distance DL to a left object 5b, the resultant data (data DL) is stored. In step 206, the MPU drives the other light-emitting element, e.g., the light-emitting element 3 to measure a distance DR to a right object 5c. The resultant data (data DR) is stored in a memory.

The MPU compares the data DL and DR and controls the position of a photographing lens (not shown) in accordance with data representing a shorter distance (step 207). The flow advances to step 204, and a series of operations are completed.

According to the second embodiment, when the central portion distance does not fall within the predetermined distance, the lens position is set by a shortest detected distance of the plurality of detected peripheral portion distances. Therefore, focal control can be more accurately performed than the first embodiment in which focal control is performed on the basis of the average distance of the distances to the peripheral portions with respect to the principal object.

Figure 7:
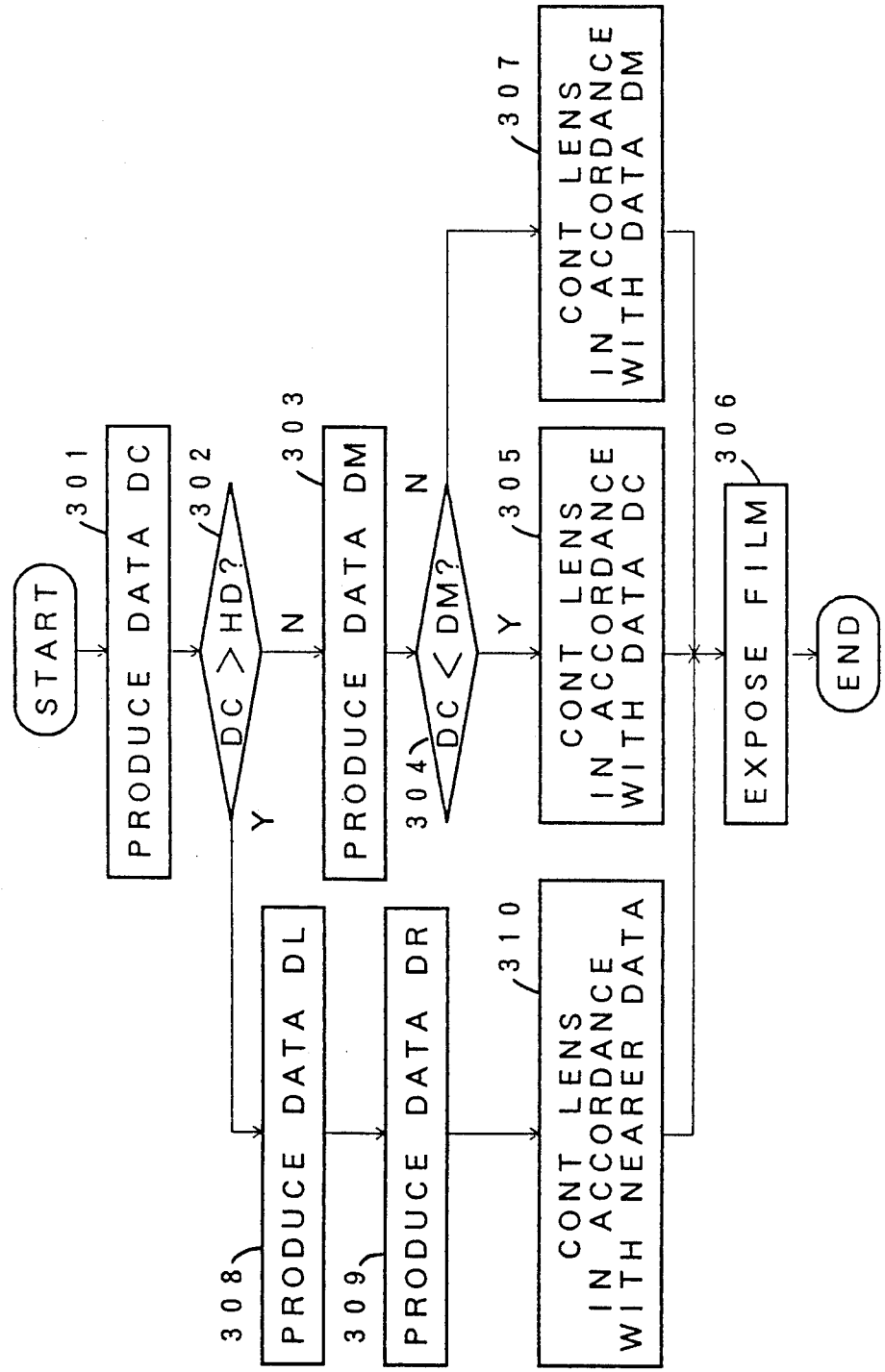

Third Embodiment (FIG. 7)

In step 301, the MPU sends control signals to the driver 11 to drive the light-emitting element 1 to measure a distance DC to the object 5a located at the central portion of the frame, and data DC is stored in a memory to complete a distance measurement of the central portion.

The MPU determines in step 302 whether the data DC represents a distance longer than the hyperfocal distance. If the distance DC is shorter than the hyperfocal distance HD, the two end light-emitting elements 2 and 3 are simultaneously operated to obtain an average distance DM of the distances measured by the light beams from the light-emitting elements 2 and 3. The resultant data DM is stored in the memory. In step 304, the stored data DC and DM are compared with each other.

In step 304, if the central portion distance DC is shorter than the distance DM, the photographing lens is driven in accordance with the data DC (step 305), and focal control is performed. When focal control is completed, a shutter release operation such as film exposure is performed (step 306). However, if the average distance DM is shorter than the distance DC, the position of the photographing lens is controlled in accordance with the data DM (step 307), and the flow advances to step 306.

When the central portion distance represented by the data DC obtained in step 302 is longer than the hyperfocal distance HD, the MPU drives one of the end light-emitting elements 2 and 3, e.g., the light-emitting element 2 to measure a distance DL to the left object 5b, and the corresponding data (data DL) is stored in the memory in step 308. Subsequently, in step 309, the MPU measures a distance DR to the right object 5c upon operation of the other light-emitting element, and the resultant data (data DR) is stored in the memory.

In step 310, the MPU compares the data DL and DR and controls the position of the photographing lens in accordance with the data representing a shorter distance, and focal control is performed. The flow advances to step 306.

According to the third embodiment, the driver 11 simultaneously or independently drives the plurality of light-emitting elements 2 and 3. The MPU compares the distance DC to the central portion with the hyperfocal distance HD and selectively determines the distance signals representing distances to the plurality of peripheral portions and the average distance signal on the basis of the output signals from the position sensors 7 and 8. When the detected distance to the central portion is shorter than the hyperfocal distance and the average distance obtained upon simultaneous driving of the light-emitting elements 2 and 3, the lens position is set on the basis of the detected position of the central portion. However, when the detected distance to the central portion is longer than the average distance, the lens position is set on the basis of the average distance. When the detected distance to the central portion is longer than the hyperfocal distance, the lens position is set on the basis of the shortest detected distance. Therefore, wasteful power consumption of the battery can be prevented, and accurate distance measurements can be performed.

Figure 8:
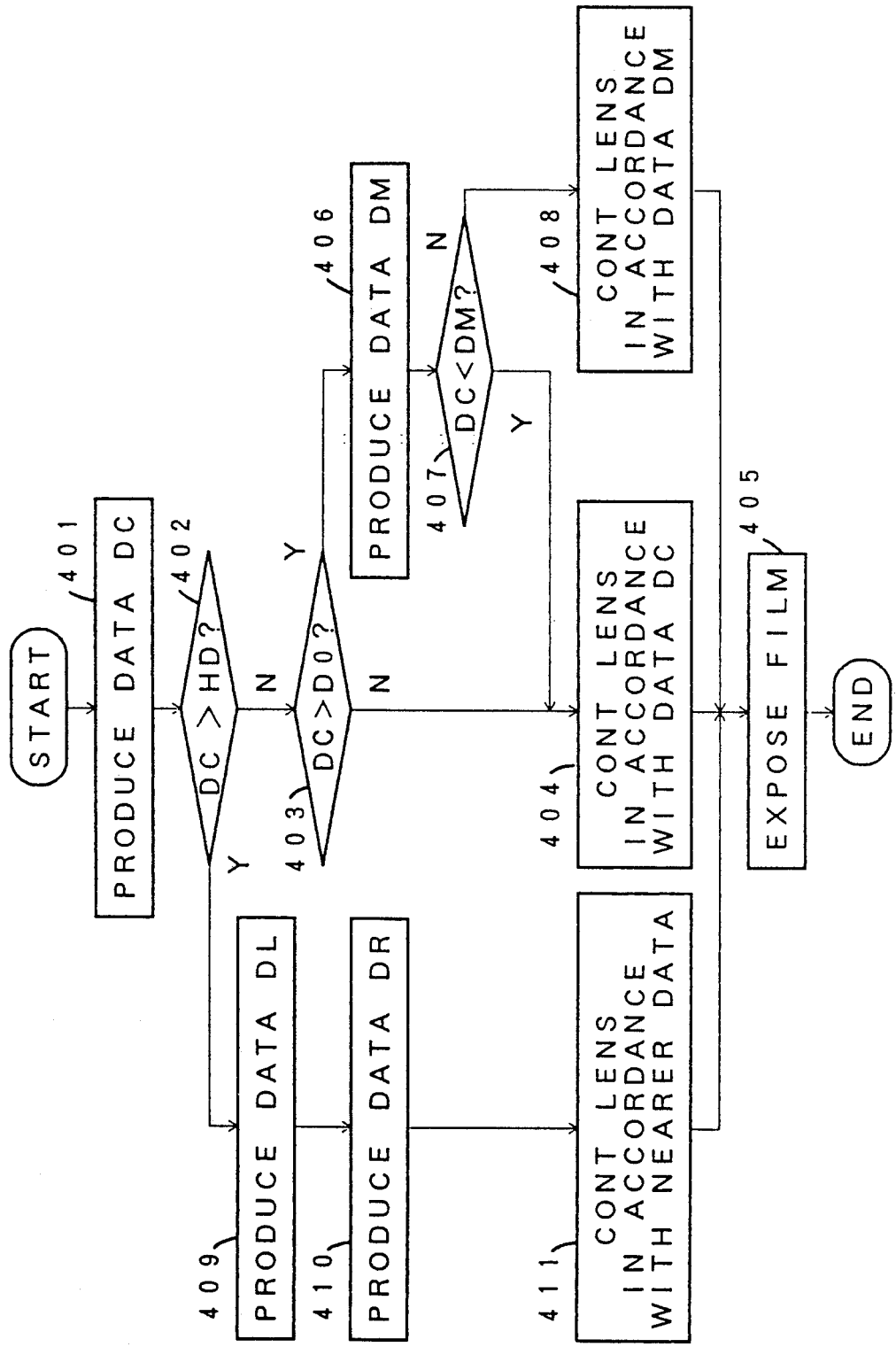

Fourth Embodiment (FIG. 8)

The MPU measures a distance DC up to the object 5a located at the central portion of the frame upon operation of the light-emitting element 1, and data DC is stored in the memory, thereby completing the distance measurement of the central portion (step 401).

The MPU determines in step 402 whether the central portion distance DC is longer than the hyperfocal distance HD. If NO in step 402, the MPU compares the central portion distance DC with a prestored predetermined distance D0 in step 403. If NO in step 403, i.e., if the MPU determines that the distance DC is shorter than the predetermined distance D0, the photographing lens is controlled in accordance with the data DC (step 404), and focal control is performed.

However, if the distance DC is longer than the predetermined distance D0, i.e., if YES in step 403, the two light-emitting elements 2 and 3 are simultaneously operated to obtain an average distance DM of the distances measured by the position sensors 7 and 8, and the corresponding data DM is stored in the memory in step 406. The data DC and DM are compared with each other to determine whether the distance DC is shorter than the average distance DM (step 407).

If YES in step 407, i.e., the distance DC is shorter than the average distance DM, the flow advances to step 404. However, if NO in step 407, i.e., the distance DC is longer than the distance DM, the lens position is controlled in accordance with the data DM (step 408). The flow then advances to step 405.

When the MPU determines in step 402 that the distance DC is longer than the hyperfocal distance HD, the MPU operates one of the light-emitting elements 2 and 3, e.g., the light-emitting element 2 to measure a distance DL to the left object 5b, and data DL is stored in the memory (step 409). Subsequently, the other light-emitting element, e.g., the light-emitting element 3 is operated to measure a distance DR to the right object 5c, and data DR is stored in the memory (step 410).

The data DL and DR are compared to each other, and focal control is performed in accordance with data of a shorter distance (step 411). The flow advances to step 405, and a shutter release operation such as film exposure is performed. A series of operations are then completed.

According to the fourth embodiment, the predetermined distance D0 shorter than the hyperfocal distance is compared with the distance to the central portion. If the distance DC to the central portion is shorter than the predetermined distance D0 or is longer than the predetermined distance D0 but shorter than the average distance DM, the lens position is set in accordance with the central portion distance DC. However, when the distance DC is longer than the average distance DM, the lens position is set in accordance with the average distance DM. In addition, when the distance DC is longer than the hyperfocal distance HD, the lens position can be set in accordance with the shortest detected distance of the plurality of detected distances. Therefore, the power consumption of the battery can be minimized, and highly accurate distance measurements can be performed.

What is claimed is:

1. A distance-measuring apparatus for a camera, comprising:
    first detecting means for detecting a distance to a central portion of an object field;
    second detecting means for detecting respective distances to a plurality of peripheral portions of the object field; and
    operating means adapted to operate said first and second detecting means, said operating means including means for comparing the detected distance to the central portion of said object field with a predetermined distance, said operating means operating said second detecting means so as to detect the distances to said plurality of peripheral portions simultaneously when the detected distance to said central portion is less than said predetermined distance, and operating said second detecting means so as to detect the distances to said plurality of peripheral portions sequentially when the detected distance to the central portion of said object field is greater than said predetermined distance.

2. A distance-measuring apparatus according to claim 1, wherein said camera has a phototaking optical system with a hyperfocal distance that is said predetermined distance.

3. A distance-measuring apparatus for a camera according to claim 1, wherein said peripheral portions exclude the central portion of said object field.

4. A distance-measuring apparatus for a camera, comprising:
    detecting means for detecting a distance to a central portion of an object field and for detecting respective distances to a plurality of peripheral portions of the object field; and
    operating means including means for comparing the detected distance to the central portion of said object field with a predetermined distance, means for determining an average of the detected distances to said peripheral portions of said object field, and means for comparing the detected distance to said central portion with said average, said operating means producing a first output when the detected distance to the central portion of said object field is less than said predetermined distance and less than said average, producing a second output when the detected distance to said central portion is less than said predetermined distance and greater than said average, and producing a third output when the detected distance to said central portion is greater than said predetermined distance.

5. A distance-measuring apparatus for a camera, according to claim 4, wherein said first output is in accordance with the detected distance to the central portion of said object field, said second output is in accordance with said average, and said third output is in accordance with a shortest of the detected distances to the peripheral portions of said object field.

6. A distance-measuring apparatus for a camera, comprising:
    detecting means for detecting a distance to a central portion of an object field and for detecting respective distances to a plurality of peripheral portions of said object field; and
    operating means including means for comparing a detected distance to the central portion of said object field with a first predetermined distance, means for comparing the detected distance to the central portion of said object field with a second predetermined distance that is less than the first predetermined distance, means for determining an average of the detected distance to the peripheral portions of said object field, and means for comparing the detected distance to said central portion with said average, said operating means producing a first output when the detected distance to said central portion is less than said first predetermined distance and less than said second predetermined distance and also producing said first output when the detected distance to said central portion is less than said first predetermined distance, greater than said second predetermined distance, and less than said average, said operating means producing a second output when the detected distance to said central portion is less than said first predetermined distance, greater than said second predetermined distance, and greater than said average, and said operating means producing a third output when the detected distance to said central portion is greater than said first predetermined distance.

7. A distance-measuring apparatus for a camera according to claim 6, wherein said first output is in accordance with the detected distance to said central portion of said object field, said second output is in accordance with said average, and said third output is in accordance with a shortest of the detected distances to said plurality of peripheral portions of said object field.

8. A distance-measuring apparatus for a camera according to claim 7, wherein said detecting means detects the distance to the central portion of said object field before detecting distances to the plurality of peripheral portions of said object field, and said operating means compares the detected distance to said central portion with said first predetermined distance and compares the detected distance to said central portion with said second predetermined distance before determining said average, and wherein, when the detected distance to the central portion of said object field is less than said first predetermined distance and is less than said second predetermined distance, said operating means prevents said detecting means from detecting distances to said plurality of peripheral portions of said object field and said operating means produces said first output without determining said average.

* * * * *